Oct. 18, 1949.   J. D. GUELPH   2,485,283
EJECTOR MECHANISM FOR MOLDING MACHINES
Filed Jan. 30, 1947   3 Sheets-Sheet 1

INVENTOR.
JohnD.Guelph
BY
ATTORNEY

Oct. 18, 1949.　　　　　J. D. GUELPH　　　　　2,485,283
EJECTOR MECHANISM FOR MOLDING MACHINES
Filed Jan. 30, 1947　　　　　　　　　　　　　　3 Sheets-Sheet 2
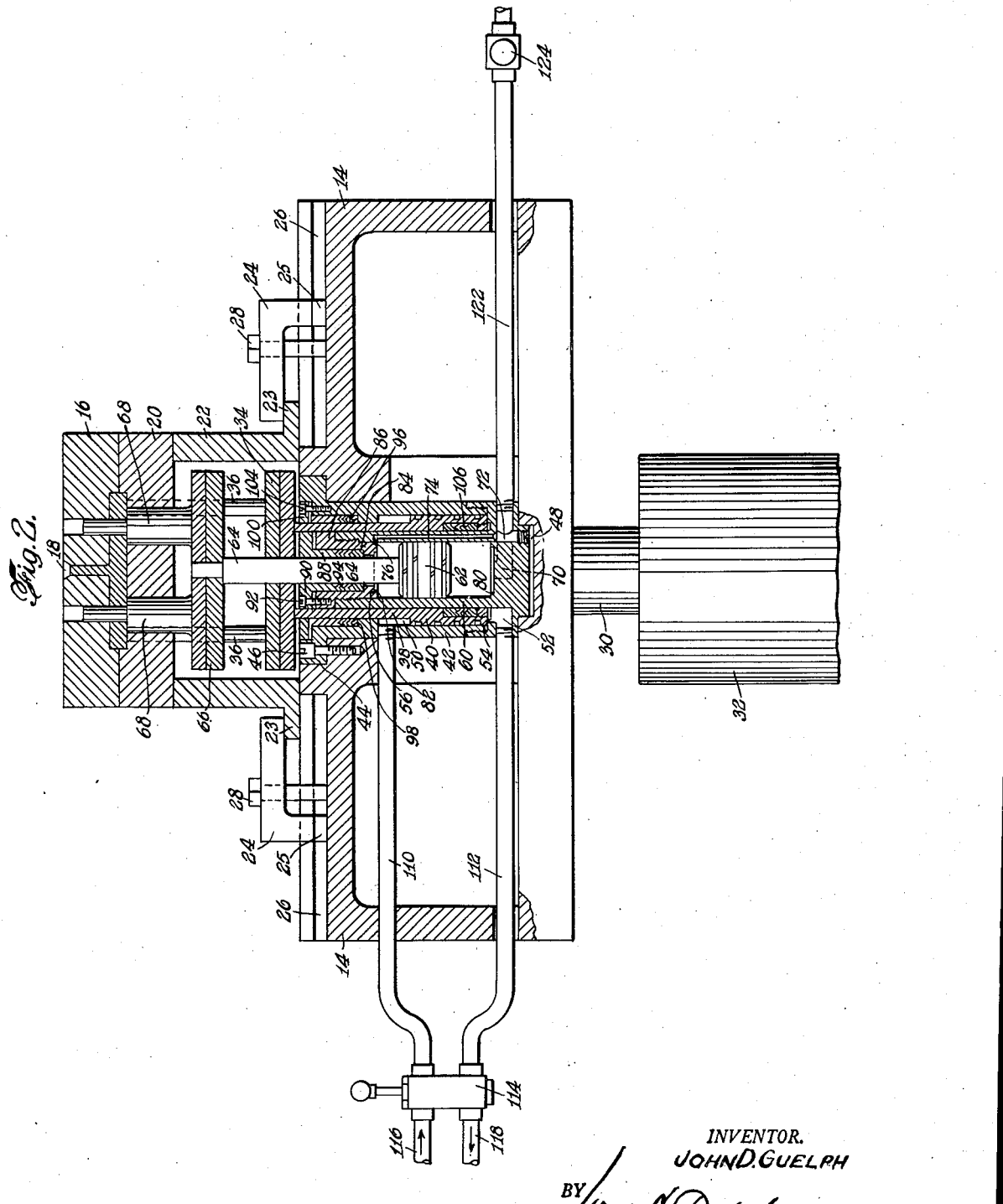
INVENTOR.
JOHN D. GUELPH
BY
ATTORNEY.

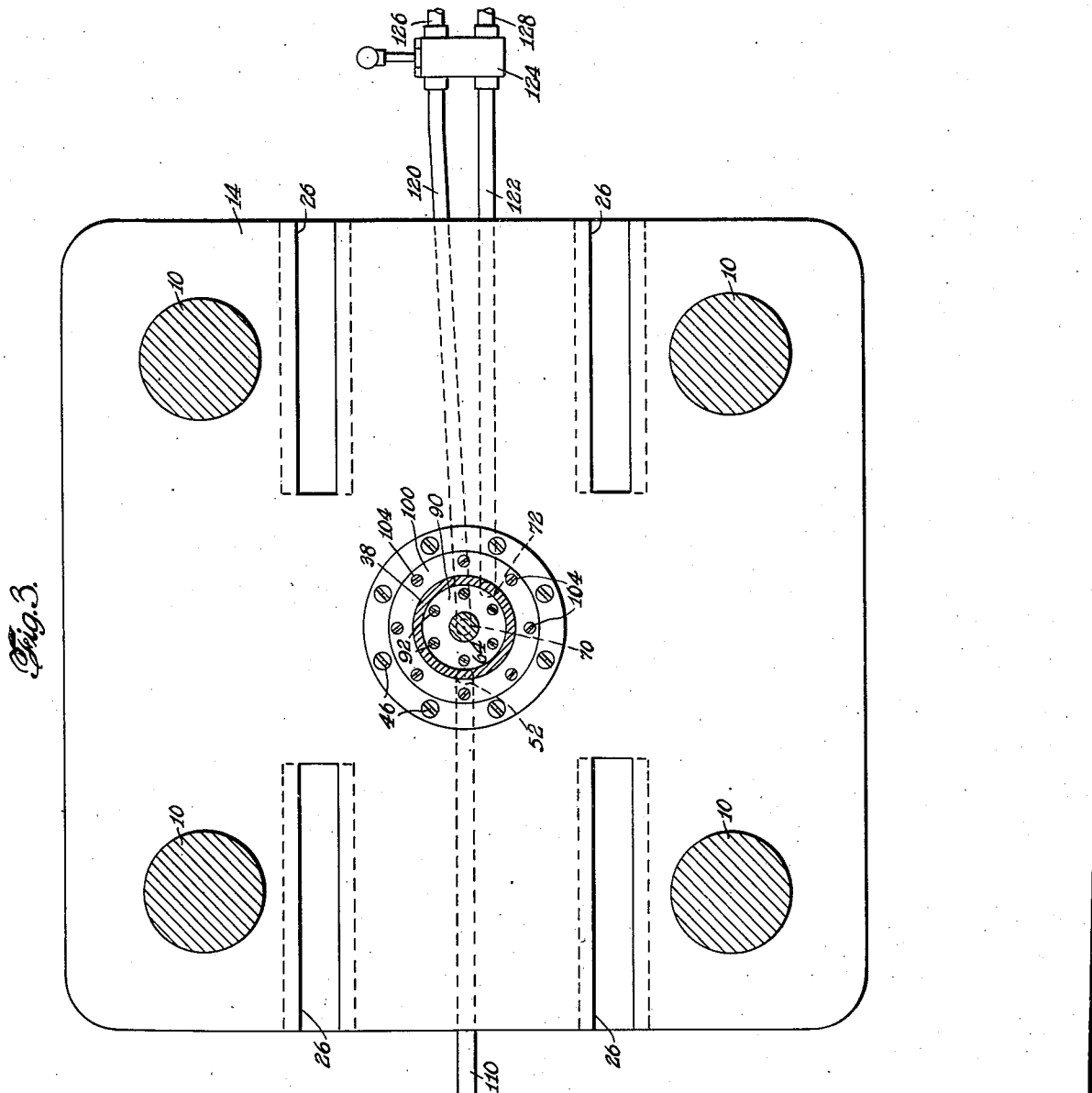

Patented Oct. 18, 1949

2,485,283

UNITED STATES PATENT OFFICE 2,485,283

EJECTOR MECHANISM FOR MOLDING MACHINES

John D. Guelph, Paterson, N. J., assignor to A. R. D. Corporation, New York, N. Y., a corporation of New York Application January 30, 1947, Serial No. 725,381

5 Claims. (Cl. 18—16)

This invention relates to molding machines. More particularly, it relates to a new and improved ejecting mechanism for molding machines.

In conventional injection-molding machines wherein the molding cavity is formed by a pair of complemental relatively movable die members, the casting is removed from the die by ejector pins after the die members have been separated. In general, in such machines the ejector pins are carried on an ejector plate which, in turn, is secured to an ejector rod projecting from the movable platen (mold clamp). The ejector rod, as the mold clamp moves in its opening stroke, strikes and engages a stationary part of the machine whereby, during further descent of the movable platen, the ejector plate and the pins carried thereby are actuated to eject the molding from the die.

In conventional injection-molding machines wherein cores are utilized, the molding is either stripped from the cores by the ejecting mechanism previously described, or the molding together with the cores are ejected by the ejecting mechanism and thereafter the cores manually pulled or moved by means dependent on the stroke.

In each of the aforementioned injection-molding machines, the removal of the molding from the die is effected during and is dependent on the opening stroke of the mold clamp.

An object of this invention is to provide an ejecting mechanism for a molding machine which is operative independently of the stroke of the opening clamp.

Another object of this invention is to provide an ejecting mechanism for an injection-molding machine which can be operated at any position of the clamp and independently of the stroke of said clamp.

An additional object of this invention is to provide a core puller for an injection-molding apparatus which is operative independently of the stroke of the opening clamp.

A further object of this invention is to provide a core puller for an injection-molding apparatus which can be operated in any position of the clamp and independently of the stroke of said clamp.

A still further object of this invention is to provide a core puller and an ejector for an injection-molding apparatus, said core puller and ejector being separately operated in the desired sequence and independently of the stroke of the opening clamp.

Other and additional objects will become apparent hereinafter.

The objects of this invention are accomplished, in general, by associating a core plate and an ejector plate with the die member carried by the movable clamp of an injection-molding machine, and providing separate means to actuate the core plate and the ejector plate in the desired sequence independently of each other and the stroke of the opening clamp.

The ejector plate is secured to one end of a piston rod, the other end of which is secured to an ejector plate piston slidably mounted in an outer cylinder disposed in a centrally located opening in the movable platen. The outer cylinder is provided with appropriately located ports for the delivery and discharge of fluid pressure whereby the ejector plate piston is actuated in a vertical direction and the ejector plate will be moved up or down depending on the direction of movement of the piston.

The ejector plate piston and piston rod are made hollow, and a second (inner) cylinder carried by the head of the outer cylinder is disposed therein. A core plate piston is slidably positioned in the inner cylinder, and the piston rod thereof is secured to the core plate. The inner cylinder is provided with appropriately located ports for the delivery and ejection of fluid pressure whereby the core plate piston is actuated in a vertical direction and the core plate moved up or down depending on the movement of the piston to which it is connected.

Each of the pistons is separately controlled and actuated, with the result that the core plate and the ejector plate are moved independently of each other and in the desired sequence. Also, each of the pistons can be operated independently of the movement of the movable platen.

When the apparatus is employed for the production of solid castings which do not require the utilization of cores, the core plate is omitted and the ejector plate is positioned on both the piston rods and either one can be operated to effect the ejecting action after the movable platen has been opened to the desired position.

The invention will be more clearly understood by reference to the following detailed description when taken in connection with the accompanying drawings, in which:

Figure 2 is a vertical section with the upper platen omitted; and

Figure 3 is a top plan view of the apparatus shown in Figure 2, the ejector box being omitted.

Figure 1:
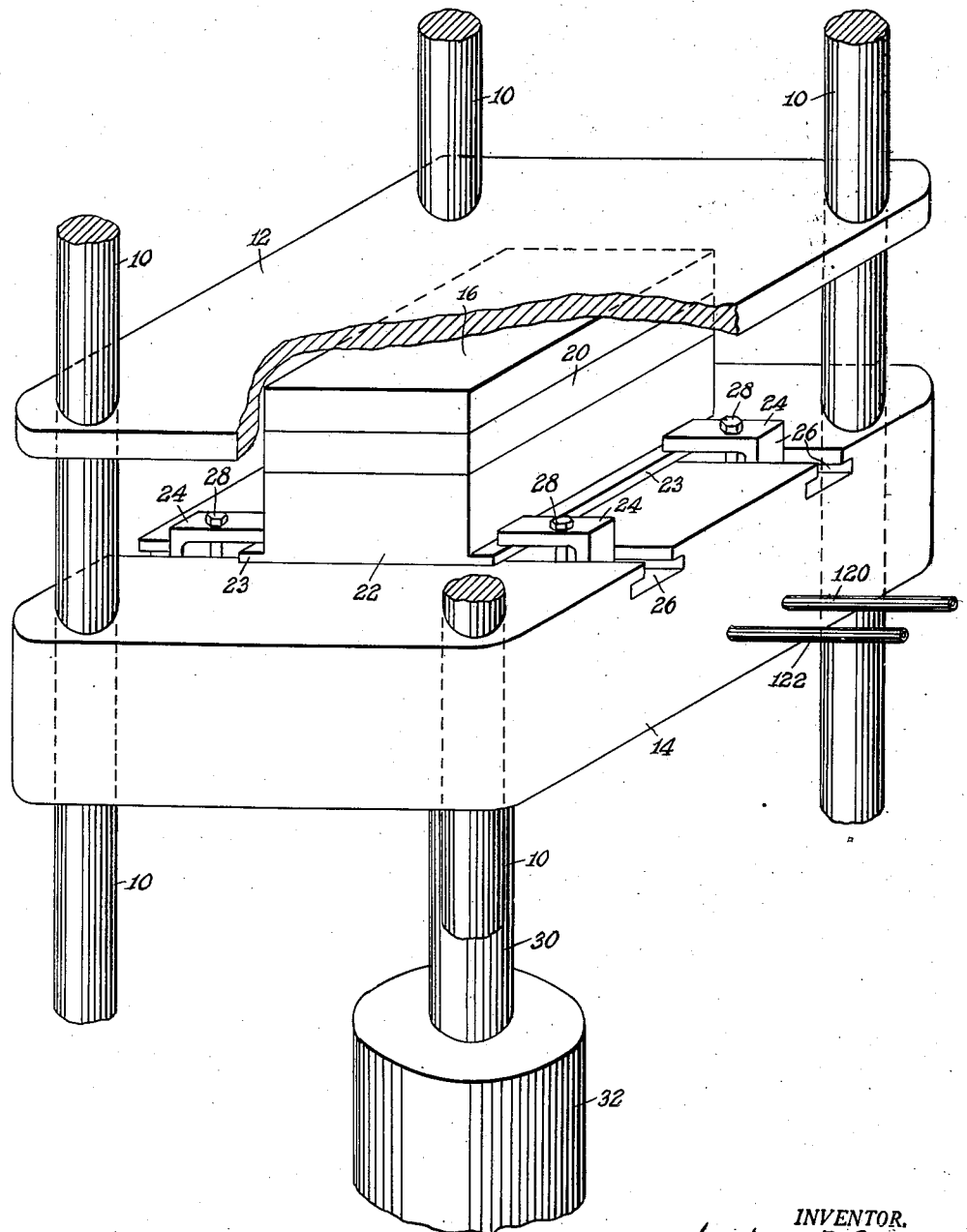
Figure 1 is a perspective view, partly broken away, of an injection-molding machine containing the core puller and ejector plate mechanisms.

Referring now to the drawings wherein like reference numerals designate like parts, the reference numeral 10 designates a plurality of rods which are appropriately secured and fixedly mounted in the machine and on which a platen 12 is fixedly secured and a movable platen 14 is appropriately mounted for sliding movement thereon. An upper die member 16 is appropriately removably secured to the under surface of the top fixed platen 12. The die member 16 is provided with a passage 18 which is connected to a gate (not shown) and into which the material to be molded is introduced.

The upper die member 16 is designed to cooperate with a lower die member 20. The two die members 16 and 20 are complemental and, when in molding position as hereinafter more fully described, will provide a molding cavity or cavities of the desired shapes and sizes.

The lower die member 20 is appropriately removably secured onto an ejector box 22, the bottom of which is seated on and adjustably secured to the lower platen 14. The bottom of the ejector box 22 is provided with side flanges 23 which are adapted to be engaged by spaced clamps 24. Each clamp 24 is provided with a T-shaped tongue 25 which is slidably positioned in a T-slot 26 in the lower platen and is secured in clamping position by a lock screw 28. The lower platen 14 is secured at its bottom to the top of a piston 30 which is actuated by hydraulic means, generally designated by the reference numeral 32, in the usual manner to raise and lower the platen 14. If desired, the usual hydraulic means (not shown) can cooperate with the top platen 12.

In the ejector box 22, there is provided an ejector plate 34 which carries ejector pins 36. The ejector plate 34 is secured to a hollow piston rod 38 which is secured at its lower end to a piston 40. The piston 40 is slidably positioned in an outer cylinder 42 positioned in a central opening in the lower platen 14. The cylinder 42 is provided at the top thereof with an annular flange 44 which is disposed in an annular recess in the top of the lower platen 14 and secured therein by means of screws 46. A cylinder head 48 is threadedly secured onto the bottom of the cylinder 42. The cylinder 42 and the head 48 are provided with ports 50 and 52 respectively whereby pressure fluid can be introduced and discharged for actuating the piston 40. A shoulder 54 on the head 48 and a shoulder 56 on the cylinder 42 constitute stops which limit movement of the piston 40 in its downward and upward movements respectively.

The piston 40 and its extension (piston rod) 38 are hollow and receive an inner cylinder 60. In the form shown, the inner cylinder 60 is formed integrally with and extends upwardly from the head 48. A piston 62 is slidably positioned in the inner cylinder 60 and the piston rod 64 thereof is secured at its upper end to a core plate 66 located in the ejector box 22. The core plate 66 is provided with cores 68. Approximately located ports communicate with the interior of the inner cylinder whereby fluid pressure can be introduced and discharged therefrom and the piston actuated either up or down as desired. In the form shown, the head 48 is provided with ports 70 and 72. The port 70 leads to below the piston 62, and the port 72 is connected to the lower end of a passage 74 in the wall of the inner cylinder 60. The passage 74 terminates at its upper end in a passage 76 which leads into the interior of the inner cylinder 60 above the piston 62.

The ejector plate 34 is provided with a central hole in which the piston rod 64 is slidably positioned. The piston 62 is limited in its downward movement by a shoulder 80 on the head 48 and in its upward movement by a stop 82. The stop 82 is formed at the lower end of a cylindrical member 84 which is threaded into the inner cylinder 60 at the top thereof. The member 84 is provided at the top thereof with an annular flange 86 which is seated on the top edge of the inner cylinder 60. A bushing 88 is disposed in the member 84. The bushing 88 is provided with an annular flange 90 which is seated on the flange 86. Screws 92 secure the bushing to the member 84.

A ring packing 94 is positioned between the lower end of the bushing 88 and the upper end of the stop 82. A ring packing 96 is positioned on an inner shoulder 98 of the outer cylinder 42 and is maintained in position by a locking ring 100 secured to the outer cylinder 42 by screws 104. Another packing ring 106 is provided in the inner surface of the piston 40 adjacent the bottom thereof.

The ports 50 and 52 are connected to suitable conduits 110 and 112 which, in turn, are connected to a four-way valve 114. The four-way valve 114 is connected to a fluid pressure line 116 and to a line 118 leading to a sump (not shown). The valve 114 is a conventional four-way valve and, when it is operated in one direction, fluid under pressure from the line 116 is fed through the valve 114 into the line 112 to the port 52, and the line 110 is connected to the line 118 leading to the sump. Under these conditions, the piston 40 is moved upwardly and the ejector plate is moved upwardly. When the valve 114 is operated in the other direction, the piston 40 will be operated in the other direction, i. e., the pressure fluid will be directed from the line 116 by the valve 114 through the line 110, and the ejected fluid will be conducted from the cylinder by the line 112 through the valve 114 to the line 118.

The ports 70 and 72 are connected respectively to conduits 120 and 122 which lead to a conventional four-way valve 124. A line 126 leads fluid under pressure to the valve 124, and a line 128 connected to the valve 124 leads to a sump (not shown). When the valve is operated in one direction, the fluid under pressure is fed through the line 120 and through the port 70 whereby the piston 62 is moved upwardly. The fluid ejected from the inner cylinder by the upward movement of the piston 62 is conducted through the port 72 to the line 122 which is connected through the valve 124 to the sump. When the valve 124 is operated in the other direction, the movement of the piston 62 is reversed.

In operation, the desired die member 16 is secured to the upper platen 12 and the desired complemental die member 20, together with the appropriate ejector box 22, is clamped in proper position on the lower platen 14 by means of the clamps 24. The ejector plate 34 is secured to the piston rod 38 of the piston 40, and the core plate 66 is secured to the piston rod 64 of the piston 62. At this stage of the operation, the piston 62 is at the end of its upward stroke and in position so that upon actuation it will move in a downward direction to pull the cores, and the piston 40 is at the end of its downward stroke and in position so that upon actuation thereof it will move in an upward direction and cause the ejecting pins to strip the molding from the die. The hydraulic mechanism 32 is actuated to elevate the lower platen and clamp the die member 16 in close intimate relationship with the die member 20. At this stage, the ejector plate 34 and the core plate 66, together with their respective operating mechanisms, are positioned as shown in Figure 2.

The plastic to be molded, which is previously preheated, is forced under pressure through the gate and through the passage 18 to fill the die cavities. After the molding has cooled sufficiently, the hydraulic means 32 is actuated so that it will cause the lower platen to descend and separate the die members 16 and 20 from each other.

At any desired time after the lower die member 20 has separated from the die member 16, the valve 124 is operated so that fluid under pressure is fed from the line 126 through the line 122 and through the port 72, whereby the piston 62 is caused to descend and the cores are pulled. During this operation, the fluid ejected from the inner cylinder is fed away through the line 120 and directed into the line 128 by the valve 124. After the cores have been pulled, the valve 114 is actuated so that fluid under pressure from line 116 is fed into the line 112 and into the outer cylinder through the port 52, whereby the piston 40 is moved upwardly, with the result that the ejector plate 34 also is moved upwardly and the molding stripped from the dies. During this operation, the line 110 is connected through the valve 114 to the line 118. After the molding has been removed, the valves 114 and 124 are each actuated to restore the ejector plate and the core plate to the original molding position, and the cycle of operations previously described repeated.

If desired, the core plate can be secured to the piston rod 38 and the ejector plate secured to the piston rod 64.

Though hereinbefore the invention has been described as applied to an injection-molding machine for the molding of articles requiring the use of cores, it is to be understood that the invention is not restricted thereto. The invention is equally applicable for use in injection-molding machines for molding solid articles which do not require the use of cores. In such an embodiment of the invention, the core plate 66, together with the cores 68 described in the proceding embodiment, is omitted, and the ejector plate is disposed on both of the piston rods. In such embodiment, both pistons are in position so that, upon actuation of either or both, the ejector plate will be moved upwardly.

In the embodiment described in the preceding paragraph, after the molding operation and the molding has sufficiently cooled, the hydraulic means 32 is actuated to move the lower platen downwardly whereby the die members are separated. After separation, the operator can operate either valve 114 or 124 or both, as desired, whereby the piston 62 or the piston 40 is actuated to move in an upward direction. The movement of either or both of the pistons will elevate the ejector plate whereby the molding will be ejected from the die.

As is apparent from the foregoing embodiments, the pistons and their actuating mechanisms can be used without change with either dies having both ejecting means and a core-pulling means, or dies having only ejecting means. In general, the invention can be utilized to actuate any mechanism associated with the die in an injection-molding machine and which removes or aids in removing the molding from the die cavity.

When the injection-molding machine is intended to produce only solid moldings not requiring the use of cores, not only can the core plate be omitted but also the core plate piston and the actuating mechanism therefor. In such a machine, the ejector plate can be secured to the one piston. Preferably, the ejector plate is, in such embodiment, secured to the piston 62 and the outer cylinder can also be omitted.

The invention, though it is admirably suitable for use with injection-molding machines with or without cores, is not restricted thereto. It can be utilized in molding machines of any type wherein the die members which form the molding cavity are movable relative to each other and which utilize ejecting pins with or without core pullers.

In general, the invention can be applied to molding machines, such as injection-molding machines, die casting machines, compression-molding machines, transfer molding machines, powder metallurgy pressers, ceramic compression pressers or the like, irrespective of whether the die members move relative to each other in a horizontal or vertical direction.

The invention can be applied to molding machines irrespective of the size of the moldings.

The ejection and core-pulling operations when used are effected separately and independently of each other in the desired sequence. These operations are also effected independently of the movement of the lower platen and can be effected after the dies have been separated and the lower platen is stationary. Of course, the operations in the proper sequence can be effected after separation and during the movement of the lower platen away from the upper platen.

Since it is obvious that various changes and modifications may be made in the above description without departing from the nature or spirit thereof, this invention is not restricted thereto except as set forth in the appended claims.

I claim:

1. A molding machine comprising a pair of platens, a die member carried by each of said platens, means to move one of said platens relative to the other, a pair of concentric cylinders carried by the movable platen and spaced radially to form an annular chamber therebetween, an annular piston disposed in said chamber and slidable between said cylinders, a second piston slidably disposed in the inner cylinder, an ejector plate directly seated on one of said pistons, a core plate directly secured to the other of said pistons, and means to actuate each of said pistons independently of the other.

2. A molding machine comprising a pair of platens, a die member carried by each of said platens, means to move one of said platens relative to the other, a pair of concentric cylinders carried by the movable platen and spaced radially to form an annular chamber therebetween, an annular piston disposed in said chamber and slidable between said cylinders, a second piston slidably disposed in the inner cylinder, an ejector plate directly seated on one of said pistons, a core plate directly secured to the other of said pistons, and means to actuate each of said pistons independently of the other and independently of the movement of the movable platen.

3. A molding machine comprising a pair of platens, a die member carried by each of said platens, means to move one of said platens relative to the other, a pair of concentric cylinders carried by the movable platen and spaced radially to form an annular chamber therebetween, an annular piston disposed in said chamber and slidable between said cylinders, ejecting means secured to said annular piston, a second piston slidably disposed in the inner cylinder, core-pulling means secured to the second piston, and means to actuate each of said pistons independently of each other and independently of the movement of the movable platen.

4. A molding machine comprising a pair of platens, a die member carried by each of said platens, means to move one of said platens relative to the other, a pair of concentric cylinders carried by the movable platen and spaced radially to form an annular chamber therebetween, an annular piston disposed in said chamber and slidable between said cylinders, ejecting means secured to said annular piston, a second piston slidably disposed in the inner cylinder, core-pulling means secured to the second piston, said annular piston having a bottom surface to receive the fluid thrust from said annular chamber and having an upwardly facing, outer annular shoulder forming with the outer cylinder an annular chamber to receive fluid for forcing said annular piston downwardly; and fluid supply means to actuate said pistons independently of the movement of the movable platen.

5. A molding machine comprising a pair of platens, a die member carried by each of said platens, means to move one of said platens relative to the other, a pair of concentric cylinders carried by the movable platen and spaced radially to form an annular chamber therebetween, an annular piston disposed in said chamber and slidable between said cylinders, a second piston slidably disposed in the inner cylinder, movable die components actuated by both of said pistons, and separate means to actuate each of said pistons independently of the other and independently of the movement of the movable platen.

JOHN D. GUELPH.

REFERENCES CITED

The following references are of record in the file of this patent:

UNITED STATES PATENTS

| Number | Name | Date |
|---|---|---|
| 1,724,332 | Will et al. | Aug. 3, 1929 |